(12) United States Patent
Scholten et al.

(10) Patent No.: US 8,357,735 B2
(45) Date of Patent: Jan. 22, 2013

(54) BLOCK COPOLYMER AND POLYMER MODIFIED BITUMINOUS BINDER COMPOSITION FOR USE IN BASE COURSE ASPHALT PAVING APPLICATION

(75) Inventors: Erik Jan Scholten, Amsterdam (NL); Willem C. Vonk, Zwaag (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 13/427,651

(22) Filed: Mar. 22, 2012

(65) Prior Publication Data

US 2012/0219811 A1 Aug. 30, 2012

Related U.S. Application Data

(63) Continuation of application No. 12/937,666, filed on Oct. 13, 2010, now abandoned.

(51) Int. Cl.
*C08L 95/00* (2006.01)
*B32B 11/00* (2006.01)

(52) U.S. Cl. .......................................... 524/59; 428/489
(58) Field of Classification Search ..................... 524/59
See application file for complete search history.

(56) References Cited

U.S. PATENT DOCUMENTS

| | | | |
|---|---|---|---|
| 3,231,635 A | 1/1966 | Milkovich | |
| 3,244,664 A | 4/1966 | Zelinski et al. | |
| 3,251,905 A | 5/1966 | Zelinski | |
| 3,281,383 A | 10/1966 | Zelinski et al. | |
| 3,390,207 A | 6/1968 | Moss et al. | |
| 3,594,452 A | 7/1971 | De La Mare et al. | |
| 3,598,887 A | 8/1971 | Darcy et al. | |
| 3,692,874 A | 9/1972 | Farrar et al. | |
| 3,880,954 A | 4/1975 | Kahle et al. | |
| 3,985,830 A | 10/1976 | Fetters et al. | |
| 4,076,915 A | 2/1978 | Trepka | |
| 4,104,332 A | 8/1978 | Zelinski | |
| 4,185,042 A | 1/1980 | Verkouw | |
| 4,219,627 A | 8/1980 | Halasa et al. | |
| 4,379,891 A | 4/1983 | Haynes | |
| 4,530,652 A | 7/1985 | Buck et al. | |
| 5,017,230 A | 5/1991 | Hopkins et al. | |
| 5,075,377 A | 12/1991 | Kawabuchi et al. | |
| 5,190,998 A | 3/1993 | Fisher | |
| 5,272,214 A | 12/1993 | Custro et al. | |
| 5,605,946 A | 2/1997 | Planche et al. | |
| 5,681,895 A | 10/1997 | Bening et al. | |
| 5,756,565 A | 5/1998 | Germanaud et al. | |
| 5,795,929 A | 8/1998 | Grubba | |
| 5,798,401 A | 8/1998 | Korenstra et al. | |
| 5,854,335 A | 12/1998 | Helmerikx et al. | |
| 6,150,439 A | 11/2000 | Keiichi et al. | |
| 6,508,875 B1 | 1/2003 | Bodt et al. | |
| 7,745,518 B2 | 6/2010 | Scholten | |
| 2005/0004273 A1 | 1/2005 | Chun et al. | |
| 2005/0137295 A1 | 6/2005 | Kendrick et al. | |
| 2006/0106138 A1* | 5/2006 | Trommelen et al. | 524/59 |
| 2007/0112102 A1* | 5/2007 | Kluttz et al. | 524/59 |

FOREIGN PATENT DOCUMENTS

| | | |
|---|---|---|
| EP | 0413294 A2 | 2/1991 |
| EP | 0387671 B1 | 11/1993 |
| RU | 2003123734 A | 10/2004 |
| RU | 60536 U1 | 1/2007 |
| WO | 9422931 A1 | 10/1994 |

* cited by examiner

*Primary Examiner* — Hui Chin
(74) *Attorney, Agent, or Firm* — Clements Bernard PLLC; Michael A. Masse

(57) ABSTRACT

The present invention provides a polymeric composition that includes a coupled block copolymer having a plurality of arms comprising at least two blocks of a monovinylaromatic hydrocarbon that are located on at least two of the plurality of arms, and at least one block of a conjugated diene located on at least one of the plurality of arms, and optionally one or more block copolymers comprising at least one block of monovinylaromatic hydrocarbon and at least one block of a conjugated diene, the block copolymer may be selected from linear copolymers, linear triblock copolymers, multiarm coupled block copolymers, and mixtures thereof. The molecular weight of the polymeric composition is in the range from about 100 kg/mol to about 400 kg/mol.

4 Claims, No Drawings

US 8,357,735 B2

BLOCK COPOLYMER AND POLYMER MODIFIED BITUMINOUS BINDER COMPOSITION FOR USE IN BASE COURSE ASPHALT PAVING APPLICATION

CROSS-REFERENCE TO RELATED APPLICATION(S)

This application is a continuation under 37 CFR 1.53(b) of U.S. patent application Ser. No. 12/937,666 filed Oct. 13, 2010, and entitled "A BLOCK COPOLYMER AND POLYMER MODIFIED BITUMINOUS BINDER COMPUTION FOR USE IN BASE COURSE ASPHALT PAVING APPLICATION", the disclosure of which is incorporated by reference herein.

FIELD OF THE INVENTION

The present invention relates generally to polymers for use in a polymer modified bituminous binder composition, and a polymer modified bituminous binder composition suitable for hot mix asphalt paving applications, particularly for use in the base course of a paving application. The polymer modified bituminous binder composition broadly comprises a bitumen component, and a block copolymer composition. The block copolymer composition may be comprised solely of a high vinyl content diblock copolymer. Optionally, the block copolymer composition may contain a mixture of a diblock copolymer and either a linear triblock copolymer, a multiarm coupled block copolymer, or mixtures thereof, wherein the diblock copolymer is present at a ratio of greater than 1:1 when combined with the linear triblock copolymer, multiarm coupled block copolymer or mixture thereof. The present invention further relates to a specific class of bituminous compositions comprising a bitumen component, a block copolymer composition of a high vinyl content diblock copolymer, and a high vinyl content block copolymer that is either a linear triblock copolymer, a multiarm coupled block copolymer or a mixture thereof.

The present invention relates to a coupled block copolymer and a process for making a coupled block copolymer having a plurality of arms comprising, at least two blocks of a monovinylaromatic hydrocarbon located on at least two of the plurality of arms and at least one block of a conjugated diene located on at least one of the plurality of arms, and optionally one or more block copolymers comprising at least one block of monovinylaromatic hydrocarbon and at least one block of a conjugated diene, the block copolymer may be selected from linear copolymers, linear triblock copolymers, multiarm coupled block copolymers, and mixtures thereof. The molecular weight of the polymeric composition is in the range from about 100 kg/mol to about 400 kg/mol.

The present invention further relates to a polymer modified bituminous binder composition suitable for hot mix asphalt paving applications, particularly for use in the base course of a paving application. The polymer modified bituminous binder composition broadly comprises a bitumen component, and a coupled block copolymer composition. The coupled block copolymer composition has a plurality of arms comprising at least two blocks of monovinylaromatic hydrocarbon located on at least two of the plurality of arms, and at least one block of conjugated diene located on at least one of the plurality of arms, and optionally one or more block copolymers comprising at least one block of monovinylaromatic hydrocarbon and at least one block of a conjugated diene, the block copolymer selected from linear triblock copolymers, multiarm coupled block copolymers, and mixtures thereof. The composition includes about 90 to about 98% by weight of bitumen component and about 2 to about 10% by weight of coupled block copolymer composition. The molecular weight of the coupled block copolymer composition is in the range from about 100 kg/mol to about 400 kg/mol.

BACKGROUND OF THE INVENTION

Polymer modified asphalt for paving applications and methods for preparing various polymer modified asphalt compositions are well known in the art. Various polymers, including diene elastomers such as polybutadiene, EPDM, EPR, and styrenic block copolymers (SBCs) such as styrene-butadiene-styrene (SBS) and styrene-isoprene-styrene (SIS) block copolymers, are commonly combined with bitumen to improve the performance of the bitumen. See, for example, U.S. Pat. No. 5,190,998 and U.S. Pat. No. 6,150,439. It is well known in the art to utilize styrenic block copolymers to improve the performance of bitumen. The degree to which property improvements are realized depends upon the compatibility of the block copolymer and the bitumen. Highly compatible or compatibilized polymers are most effective in providing property improvements. Over the years, researchers have developed a range of techniques to improve the compatibility of these types of polymers with bitumens.

In addition, there are improvements associated with the use of styrenic block copolymers which the bitumen paving industry would like to see. These improvements include improved fatigue performance, greater resistance to permanent deformations, greater resistance to thermal cracking, greater resistance to induced cracking, and economic savings.

Bituminous compositions containing block copolymer compositions having a high vinyl content or block copolymer compositions having a high vinyl content and a low diblock content have been used in an attempt to provide bituminous compositions with better properties. See, for example, U.S. Pat. No. 4,530,652, U.S. Pat. No. 5,798,401, U.S. Pat. No. 5,854,335, and U.S. Pat. No. 6,508,875. Compositions high in diblock have also been used to prepare bituminous compositions in an effort to provide rapid and easy mixing and to improve dispersion. See, for example, U.S. Patent Publication No. 2005/0137295 and U.S. Patent Publication No. 2005/0004273. These earlier formulations solve the specific problems with respect to the wearing course, but they are inadequate and do not offer any substantial improvement in base course applications.

U.S. Patent Publication No. 2007/0112102, which is incorporated herein by reference, discloses a process for preparing a bituminous binder composition. The publication discloses the addition of a block copolymer composition to a bitumen component for a wearing course on a roadway. The wearing course of a roadway is the top layer that automobiles drive upon, and the wearing course is also the layer that is replaced during road re-paving. This publication fails to disclose a suitable bituminous composition for base course applications.

Bitumen is used as a binder in road asphalt mixtures, and has developed continually to meet ever increasing performance demands from road building constructors. In general, bitumen performs well in road asphalt, but increasingly heavy traffic loads have led to the premature wear of many roads through rutting, raveling (e.g., loss of aggregate material), cracking of the surface, and bottom-up cracking.

Roadway construction is generally comprised of three layers. The first layer placed on grade is a sub-course of granular material or aggregate. The second layer, which is placed upon the first layer, is a base course. Optionally, there is a binder course located between the base course and the wearing course that provides a smooth surface upon the base course. The base course is the thickest and most expensive layer to apply in the construction of roadways. In the present invention, the base course is a polymer modified bituminous mixture that may have a thickness of between about 25.4 mm to about 400 mm. However, the thickness may vary and largely depends upon the projected traffic density and loading. The final or top layer is the wearing course. The wearing course is the layer automobiles drive upon and are subject to the most wear and tear. When road surfaces are replaced, the wearing course is the layer that is removed and replaced between ten or fifteen years after construction. The base course is generally not replaced, but may be replaced when rutting or cracking has occurred. Instead, the full depth reconstruction must occur if the base course fails to adequately carry the traffic loads. The base course is subject to adverse conditions like the wearing course, and there is a need for a base course that has an improved fatigue performance, greater resistance to permanent deformations, and resulting economic savings.

The present invention discloses a coupled block copolymer with a low molecular weight. The present invention is particularly useful for preparing polymer modified bituminous binder compositions to be used for road/paving applications of all sorts, and in particular for a base course. By utilizing the present invention, it is possible to prepare a polymer modified bituminous binder composition that has an improved fatigue performance, greater resistance to permanent deformations, and economic savings. Furthermore, the present invention discloses a polymer that is more compatable with hard base course bitumens than standard polymers.

An ideal asphalt mixture should be capable of maintaining its stiffness characteristics throughout a range of design temperatures. At low temperatures, the asphalt mixture is stiff and prone to cracking. On the other hand, at high temperatures, the asphalt mixture becomes soft and prone to load induced inelastic deformations. In addition, the ability of the binder to bond with the aggregates is diminished over time, allowing raveling to occur. The utilization of polymer modified mixes in the asphalt has resulted in reducing the stiffness of the asphalt mix at low temperatures, and increasing the stiffness of the asphaltic mix at high temperatures. The use of a polymer modified mix in the base course of asphaltic paving applications has displayed improved fatigue performance, greater resistance to permanent deformations, and economic aspects.

BRIEF SUMMARY OF THE INVENTION

The present invention provides a coupled block copolymer having a low molecular weight and a polymer modified bituminous composition suitable for hot mix asphalt paving applications, particularly for utilization as the base course.

The polymer modified bituminous composition suitable for the base course of a paving application comprising:

a bitumen component;

a block copolymer composition, wherein the block copolymer composition may be comprised solely of a high vinyl content diblock copolymer in a range between about 2% to about 10% by weight;

an optional high vinyl content block copolymer selected from a linear triblock copolymer, a multiarm coupled block copolymer, and mixtures thereof;

wherein the high vinyl content diblock copolymer is present alone or at a ratio greater than 1:1 when combined with the triblock copolymer, multiarm coupled block copolymer, and mixtures thereof.

In another embodiment of the present invention, the polymer modified bituminous binder composition for use as a base course in an asphalt paving application includes about 90 to about 98% by weight of a bitumen component, and about 2 to about 10% by weight of a block copolymer composition. The copolymer includes one block of a monovinylaromatic hydrocarbon and one block of a conjugated diene having a peak molecular weight from about 30,000 to about 78,000 and a vinyl content from about 35 to about 80 mol percent based upon the repeat monomer units in the conjugated diene block, and optionally one or more block copolymers comprising at least two blocks of monovinylaromatic hydrocarbon and at least one block of a conjugated diene, the block copolymer selected from linear triblock copolymers having a peak molecular weight that is 1.5 to 3 times the peak molecular weight of the copolymer, multiarm coupled block copolymers having a peak molecular weight that is 1.5 to 9 times the peak molecular weight of the copolymer, and mixtures thereof, wherein each block copolymer has a vinyl content from 35 to 80 mol percent based on the number of repeat monomer units in the conjugated diene block, wherein the polymer modified bituminous binder composition is utilized as a base course paving application.

In yet another embodiment of the present invention, the polymer modified bituminous binder composition includes the copolymer at a ratio of greater than 1:1.

In yet another embodiment of the present invention, the polymer modified bituminous binder composition that includes a copolymer that is of the formula A-B and the block copolymer is selected from block copolymers of the formula A-B-A and (A-B)nX wherein with regard to the formulas A is a block of monovinyl aromatic hydrocarbon, B is a block of conjugated diene, n is an integer from 2 to 6 and X is a coupling agent residue.

In yet another embodiment of the present invention, the block copolymer composition of the polymer modified bituminous binder composition includes A-B and A-B-A wherein each A is styrene and each B is butadiene, the peak molecular weight of A-B is from 48,000 to 78,000 and vinyl content is from 46 to 70 mol percent based on the number of repeat monomer units in the conjugated diene block of A-B, and the peak molecular weight of A-B-A is 1.8 to 2.5 times the peak molecular weight of A-B and vinyl content is from 46 to 70 mol percent based on the number of repeat monomer units in the conjugated diene block of A-B-A, and the polystyrene content of A-B is from 25% to 35% and the polystyrene content of A-B-A is from 25 to 35%.

In yet another embodiment of the present invention, the polymer modified bituminous binder composition includes the addition of a block copolymer of the formula C-D-C or (C-D)nX, wherein C is styrene, D is butadiene, isoprene or mixtures thereof, n is an integer from 2 to 6 and X is a coupling agent residue, and the additional block copolymer is added in an amount up to 30% by weight, of the total amount of block copolymer added.

The present invention further includes, a polymeric composition comprising a coupled copolymer having a plurality of arms including at least two blocks of a monovinylaromatic hydrocarbon located on at least two of the plurality of arms and at least one block of a conjugated diene located on at least one of the plurality of arms, and the polymeric composition may optionally comprise one or more block copolymers comprising at least one block of a monovinylaromatic hydrocarbon and at least one block of a conjugated diene, wherein the block copolymer is selected a linear block copolymer, multiarm block copolymers, and mixtures thereof. The molecular weight of the polymeric composition is in the range from about 100 kg/mol to about 400 kg/mol. Preferably, the molecular weight of the polymeric compound is in the range from about 150 kg/mol to about 300 kg/mol, and the coupling efficiency is equal to or less than 40%.

In yet another embodiment of the present invention the polymeric composition includes two styrene end blocks attached to two of the plurality of arms, and at least one butadiene block located on at least one of the plurality of arms.

In yet another embodiment of the present invention, the coupling agent is a silane. Preferably, the coupling agent is gamma-glycidoxy-propyl-trimethoxy-silane (gamma GPTS).

In yet another embodiment of the present invention even further relates a coupled styrene-butadiene-butadiene-styrene block copolymer containing at least two styrene arms having an absolute arm weight average molecular weight in the range from about 40 kg/mol to about 90 kg/mol and at least one butadiene arm having an absolute arm weight average molecular weight in the range from about 40 kg/mol to about 90 kg/mol, and a peak molecular weight in the range from about 100 kg/mol to about 400 kg/mol. Preferably, the molecular weight is in the range from about 150 kg/mol to about 300 kg/mol. Even more preferably, the molecular weight is about 200 kg/mol.

In yet another embodiment of the present invention even further relates to a ratio of styrene to butadiene from about 10:90 to about 40:60. Preferably, the ratio is from about 15:85 to about 30:70.

In yet another embodiment of the present invention further relates to a polymeric composition that includes a degree of branching from about 3 to about 16.

In yet another embodiment of the present invention further relates to a polymer modified bituminous binder composition for use in an asphalt paving application that includes about 90 to about 98% by weight of a bitumen component and about 2 to about 10% by weight of a coupled block copolymer composition comprising a coupled copolymer having a plurality of arms including at least two blocks of a monovinylaromatic hydrocarbon located on at least two of the plurality of arms and at least one block of a conjugated diene located on at least one of the plurality of arms, and the polymeric composition may optionally comprise one or more block copolymers comprising at least one block of a monovinylaromatic hydrocarbon and at least one block of a conjugated diene, wherein the block copolymer is selected a linear block copolymer, multiarm block copolymers, and mixtures thereof. The molecular weight of the polymeric composition is in the range from about 100 kg/mol to about 400 kg/mol.

In yet another embodiment of the present invention further relates to a process for preparing a coupled block copolymer composition that includes providing a solvent at a temperature of about 40° C. to about 60° C., adding polystyrene and sec-butyl lithium to the solvent, allowing the reaction to proceed for about 45 minutes to about 2 hours, adding polystyrene for obtaining a predetermined molecular weight, adding sec-butyl lithium and butadiene, allowing polymerization to proceed from about 15 minutes to about 1 hour, adding a coupling agent, and terminating the reaction from about 5 minutes to about 30 minutes after the coupling agent was added by the addition of a terminating agent.

DETAILED DESCRIPTION OF THE INVENTION

It has been experimented with and shown that SBS modified base course mixes exemplified that modifying the binder with polymers can give better mechanical performance that a reference base course mix without the polymer modifiers. In the present invention, the polymer content is from about 2% to about 10%. Preferably, the polymer content is from about 5% to about 8%. More preferably, the polymer content is from about 6% to about 7.5%.

One exemplary embodiment of the present invention relates generally to a polymer modified bituminous binder composition suitable for hot mix asphalt paving applications, particularly for use in the base course of a paving application. The polymer modified bituminous binder composition broadly comprises a bitumen component, and a block copolymer composition. The block copolymer composition may be comprised solely of a high vinyl content diblock copolymer. Optionally, the block copolymer composition may contain a mixture of a diblock copolymer and either a linear triblock copolymer, a multiarm coupled block copolymer, or mixtures thereof, wherein the diblock copolymer is present at a ratio of greater than 1:1 when combined with the linear triblock copolymer, multiarm coupled block copolymer or mixture thereof. The present invention further relates to a specific class of bituminous compositions comprising a bitumen component, a block copolymer composition of a high vinyl content diblock copolymer, a high vinyl content block copolymer that is a linear triblock copolymer, a multiarm coupled block copolymer, or a mixture thereof.

According to another exemplary embodiment of the present invention, a polymeric composition comprises a coupled block copolymer having a plurality of arms comprising at least two blocks of a monovinylaromatic hydrocarbon located on at least two of the plurality of arms and at least one block of a conjugated diene located on at least one of the plurality of arms, and optionally one or more block copolymers comprising at least one block of monovinylaromatic hydrocarbon and at least one block of a conjugated diene. The block copolymer may be selected from linear copolymers, linear triblock copolymers, multiarm coupled block copolymers, and mixtures thereof. The molecular weight of the polymeric composition is in the range from about 100 kg/mol to about 400 kg/mol. More particularly, the polymeric composition may be a coupled styrene-butadiene-butadiene-styrene block copolymer comprising at least two styrene arms having an absolute arm weight average molecular weight in the range from about 40 kg/mol to about 90 kg/mol and at least one butadiene arm having an absolute arm weight average molecular weight in the range from about 40 kg/mol to about 90 kg/mol, and a peak molecular weight of the styrene-butadiene-styrene-butadiene block copolymer in the range from about 100 kg/mol to about 400 kg/mol.

As used herein, the term "molecular weights" refers to polystyrene equivalent, or apparent, molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also referred to as apparent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace and are commonly referred to as "peak molecular weights".

The polymeric composition is suitable to be mixed with a bitumen component for use in paving applications of all sorts, and in particular, for use in forming the base course of an asphalt paving application. The polymer composition comprises a coupled block copolymer having a plurality of arms comprising at least two blocks of a monovinylaromatic hydrocarbon located on at least two of the plurality of arms and at least one block of a conjugated diene located on at least one of the plurality of arms, and optionally one or more block copolymers comprising at least one block of monovinylaromatic hydrocarbon and at least one block of a conjugated diene. The block copolymer may be selected from linear copolymers, linear triblock copolymers, multiarm coupled block copolymers, and mixtures thereof. The composition includes about 90 to about 98% by weight of bitumen component and about 2 to about 10% by weight of coupled block copolymer composition. The molecular weight of the coupled block copolymer composition is in the range from about 100 kg/mol to about 400 kg/mol.

The monovinylaromatic hydrocarbon block may be any monovinylaromatic hydrocarbon known for use in the preparation of block copolymers such as styrene, o-methylstyrene, p-methylstyrene, p-tert-butylstyrene, 2,4-dimethylstyrene, alpha-methylstyrene, vinylnaphthalene, vinyltoluene and vinylxylene, or mixtures thereof. The most preferred monovinylaromatic hydrocarbon for use in the present invention is styrene, which is used as a substantially pure monomer or as a major component in mixtures with minor proportions of other structurally related vinyl aromatic monomer(s) such as o-methylstyrene, p-methylstyrene, p-tert-methylstyrene, p-tert-butylstyrene, 2,4-dimethylstyrene, α-methylstyrene, vinylnaphtalene, vinyltoluene and vinylxylene, i.e., in proportions of at most 10% by weight. The use of substantially pure styrene is most preferred in the present invention.

Similarly, the conjugated diene block may be any conjugated diene known for use in the preparation of block copolymers provided that the conjugated diene has from four to eight carbon atoms. Preferably, the conjugated diene used for the preparation of the conjugated diene blocks is a butadiene monomer or an isoprene monomer that is substantially pure monomer or contains minor proportions, up to 10% by weight, of structurally related conjugated diene, such as 2,3-dimethyl-1,3-butadiene, 1,3-pentadiene, and 1,3-hexadiene. Preferably, substantially pure butadiene or substantially pure isoprene is utilized for the preparation of conjugated diene blocks, with substantially pure butadiene being the most preferred. Note that the conjugated diene block may also comprise a mixture of butadiene and isoprene monomers.

It will be appreciated that the term "vinyl content" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of isoprene via a 3,4 addition mechanism affords a geminal dialkyl C=C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, it is preferred that about 5 to about 80 mol percent of the condensed butadiene units in the polymer block have a 1,2-addition configuration. Preferably, from about 7 to about 70 mol percent of the condensed butadiene units should have 1,2-addition configuration, even more preferably from about 50 to about 65 mol percent of the butadiene units should have 1,2-addition configuration.

The bituminous component may be naturally occurring bitumen or derived from a mineral oil. Also petroleum derivatives obtained by a cracking process, pitch and coal tar, as well as the blends thereof, can be used as bituminous components. Examples of suitable components include distillation or "straight-run" bitumens, precipitation bitumens, e.g., propane bitumens, blown bitumens and mixtures thereof. Other suitable bitumens include mixtures of one or more of these bitumens with extenders such as petroleum extracts, e.g. aromatic extracts, distillates or residues, or with oils. Some representative examples of bitumens that may be used in the present invention have a PEN value of below about 300 dmm as measured by ASTM Method D5 (at 25° C.), and more in particular a PEN value in the range of from about 10 to about 300 dmm. More preferred bitumens to be used have a PEN value in the range of from about 20 to about 200 dmm, most preferably in the range of from about 20 dmm to about 80 dmm.

With proper selection of the bitumen and the polymer composition, a suitable asphalt binder can be made. Preferably, the asphalt binder exhibits a PEN value in the range of 10 to 100 dmm, preferably in the range of from 20 to 75 dmm (ASTM method D5, at 25° C.).

It is also known in the art to use cross-linking agents or "compatibilizers" such as sulphur and the like. Cross-linking agents for polymer modified bitumen applications (i.e., both in asphalt binders and in roofing compositions) are also well known in the art. As examples, U.S. Pat. No. 5,017,230, U.S. Pat. No. 5,756,565, U.S. Pat. No. 5,795,929, and U.S. Pat. No. 5,605,946 disclose various cross-linking compositions and refer to other patents that disclose cross-linking compositions. For various reasons including costs, environmental impact, and ease of use, elemental sulphur with inorganic zinc compounds are preferred. Most cross-linking formulations use elemental sulphur due to cost. In special situations, the sulphur can be added with a sulphur donor such as dithiodimorpholine, zinc thiuram disulfide, or any compound with two or more sulphur atoms bonded together. The zinc is added as zinc 2-mercaptobenzothiazole, zinc tetra alkylthiuram disulfide, zinc oxide, zinc dialkyl-2-benzosulfenamide, or other suitable zinc compound or mixtures thereof.

The compositions of the present invention may include the addition of normally solid or non-liquid cross-linking agents. These cross-linking agents are normally sold in powder or flake form. The quantity of elemental sulphur which may be employed in the invention may vary from 0.05 to 0.2 wt %, preferably from 0.1 to 0.15 wt %, based on the total amount of bituminous composition.

Preferably, the optional block copolymer composition utilized in the present invention comprises a diblock copolymer, a linear triblock copolymer or a multiarm coupled block copolymer.

In one preferred embodiment of the present invention, the coupled block copolymer is of the formula $ABnX(B_m)$, wherein said formulas A is a monovinylaromatic hydrocarbon block, B is a conjugated diene block, n is an integer from 2 to 7, X is the residue of a coupling agent, and m is an integer from 1 to 6. The sum of (m+n) is not greater than 8, preferably the sum is not greater than 6.

The block copolymers, which are useful as modifiers in the bituminous compositions according to the present invention, may be prepared by any method known in the art including the well known full sequential polymerization method, optionally in combination with reinitiation, and the coupling method, as illustrated in e.g. U.S. Pat. Nos. 3,231,635; 3,251, 905; 3,390,207; 3,598,887; and 4,219,627 and EP 0413294 A2, 0387671 B1, 0636654 A1, WO 94/22931, which are herein incorporated by reference.

In one embodiment of the present invention, the polymeric compositions are generally prepared by the addition of a monovinylaromatic hydrocarbon to a solvent and then adding sec-butyl lithium to the solvent. Another monovinylaromatic hydrocarbon is added to achieve a predetermined molecular weight. After monovinylaromatic hydrocarbon depletion, a predetermined amount of a sec-butyl lithium is added, followed by the addition of a conjugated diene. Polymerization occurs for a set period of time. Thereafter, a silane coupling agent is introduced, and the reaction is terminated by the addition of methanol. More particularly, the polymeric composition may be prepared by the addition of a polystyrene to a solvent, and adding sec-butyl lithium to the solvent. Polystyrene is then added to achieve a predetermined molecular weight. After styrene depletion, sec-butyl lithium is added, followed by the addition of butadiene at a predetermined amount of time. Polymerization is allowed to proceed for a predetermined amount of time. After butadiene depletion, a silane coupling agent is introduced. After a predetermined amount of time, the reaction is terminated by adding methanol.

Specifically, a polymeric composition in accordance with the present invention was prepared as follows: 152 g of a polystyrene was added to 6 liters of cyclohexane at 50° C., and 10.1 mmol of sec-butyl lithium is added thereafter. The reaction was completed in 1 hour, and then polystyrene was added thereto to obtain a predetermined molecular weight. After styrene depletion, 19.7 mmol of sec-butyl lithium was added, followed by the addition of 835.2 g of butadiene in 14 minutes. Polymerization was allowed to proceed at 70° C. for 30 minutes. After butadiene depletion 8.4 mmol of gamma-glycidoxy-propyl-trimethoxy-silane (gamma GPTS) was added. After 15 minutes, the reaction was terminated by adding methanol.

When the block copolymers are prepared via initial preparation of intermediate living diblock copolymers, which are subsequently coupled by means of a multivalent coupling agent, the initial diblock content will be determined by the coupling efficiency. Normally in the preparation of most block copolymers, a coupling efficiency in the range of from 80% to 97% is desirable. However, in the present invention, while it is possible to utilize polymers having a coupling efficiency of up to 90%. Preferably, there is an even lower degree of coupling (equal to or less than 40% coupling efficiency). For purposes of the present invention, the phrase "coupling efficiency" refers to the number of molecules of coupled polymer divided by the number of molecules of coupled polymer plus the number of molecules of uncoupled polymer. For example, if a coupling efficiency is 80 percent, then the polymer will contain 20 percent diblock. This is well known to those of ordinary skill in the art.

The block copolymers may therefore, for example, be prepared by coupling at least two diblock copolymer molecules together. The coupling agent may be any di- or polyfunctional coupling agent known in the art, for example, dibromoethane, diethyl adipate, divinylbenzene, dimethyldichlorosilane, methyl dichlorosilane, silicon tetrachloride and alkoxy silanes (U.S. Pat. No. 3,244,664, U.S. Pat. No. 3,692,874, U.S. Pat. No. 4,076,915, U.S. Pat. No. 5,075,377, U.S. Pat. No. 5,272,214 and U.S. Pat. No. 5,681,895), polyepoxides, polyisocyanates, polyimines, polyaldehydes, polyketones, polyanhydrides, polyesters, polyhalides (U.S. Pat. No. 3,281, 383); diesters (U.S. Pat. No. 3,594,452); methoxy silanes (U.S. Pat. No. 3,880,954); divinyl benzene (U.S. Pat. No. 3,985,830); 1,3,5-benzenetricarboxylic acid trichloride (U.S. Pat. No. 4,104,332); glycidoxytrimethoxy silanes (U.S. Pat. No. 4,185,042); oxydipropylbis(trimethoxy silane) (U.S. Pat. No. 4,379,891), and gamma-glycidoxy-propyl-trimethoxy-silane (gamma GPTS).

In general, the polymers useful in the present invention may be prepared by contacting the monomer or monomers with an organoalkali metal compound in a suitable solvent at a temperature within from about −150° C. to about 300° C., preferably at a temperature within the range of from about 0° C. to about 100° C. Particularly effective polymerization initiators are organolithium compounds having the general formula RLi wherein R is an aliphatic, cycloaliphatic, alkyl-substituted cycloaliphatic, aromatic or alkyl-substituted aromatic hydrocarbon radical having from 1 to 20 carbon atoms of which sec butyl is preferred. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Suitable aliphatic hydrocarbons further include butane, pentane, hexane and heptanes, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethyl-ether and di-n-butyl ether. Other suitable solvents will be known to one skilled in the art and can be selected to perform effectively in a given set of process conditions, with temperature being one of the major factors taken into consideration. Preferred solvents are cyclopentane or cyclohexane.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

In one embodiment of the present invention, a bitumen component is heated in a stirred tank to a temperature from about 160° C. to about 210° C., preferably from about 170° C. to about 195° C. The bitumen component utilized in the present invention may be any naturally occurring bitumen or it may be derived from petroleum. In addition, petroleum pitched obtained by a cracking process and coal tar can be used as the bitumen component as well as blend of various bitumen materials. Examples of suitable components include, but are not limited to, distillation or "straight-run bitumens", precipitation bitumens, (e.g. propane bitumens), blown bitumens (e.g. catalytically blown bitumen), multi-grades, and mixtures thereof. Other suitable bitumen components include, but are not limited to, mixtures of one or more of these bitumens with extenders (fluxes) such as petroleum extracts, e.g. aromatic extracts, distillates or residues, or with oils. Suitable bitumen components ("either "straight-run bitumens" or "fluxed bitumens") are those having a penetration of in the range of from about 10 to about 400 units at 25° C.; therefore quite hard bitumens of a penetration of from about 20 to about 80 units may be used, but generally a straight run or distilled bitumen having a penetration from about 20 to about 60 units will be the most convenient to use. Both compatible as well as incompatible bitumens may be used.

The success of the present invention is not dependent upon the type of tank (or vessel) utilized to prepare the polymer modified bituminous binder composition of the present invention. Accordingly, any known tank or vessel utilized in the preparation of bitumen compositions can be used provided that such tank or vessel has stirring (agitation) and heating capabilities. As used within the scope of the present invention, the phrase "stirred tank" refers to such tanks and vessels that have stirring (agitation) and heating means. Suitable stirring or agitation includes, but is not limited to, vertical impellers, side-arm impellers and pump around circulation. In terms of carrying out the process, the bitumen component is typically placed in the stirred tank and gradually heated to a temperature from about 160° C. to about 210° C., preferably from about 170° C. to about 195° C., and in still another alternative, from about 198° C. to about 216° C. The bitumen component is typically stirred or agitated during this heating phase. While the presence of air is not detrimental to the present invention (i.e., the use of an open air vessel which results in the surface of the mixture coming in contact with air), the intentional introduction of air (as in the case of air curing or blown bitumen) is not necessary to the of the present invention and is in fact discouraged since such addition would most likely result in the hardening of the bitumen component. In the present embodiment, once the bitumen component has reached the desired temperature, the block copolymer composition is added while the bitumen component is being stirred in order to form a homogeneous mixture of the bitumen component and the block copolymer composition.

The manner and form in which the block copolymer composition is added to the bitumen component is also not critical to the invention. Therefore, block copolymer compositions in the form of powders, porous pellets, and/or crumb may be added all at once or divided into small amounts or batches and added at intervals over a brief period of time (e.g., over a period of 5 to 60 minutes although slightly shorter or longer times are also envisioned). In most instances, the block copolymer composition is added in the form of a porous pellet all at once. Addition of the block copolymer composition over an even longer period of time is also possible but not necessarily desirable from an economic standpoint. During the addition of the block copolymer composition, the mixture is stirred and the temperature to which the bitumen component was heated (from about 160° C. to about 210° C.) is maintained.

In many bitumens, the block copolymer composition may dissolve and form a homogeneous blend with simple stirring or other agitation means as noted above. In hot mix asphalts, the bitumen forms a thin film on the aggregate that is present. It is generally accepted that the thickness of this film is on the order of approximately ten microns. Bitumen additives are generally considered to be homogeneous within a blend if they completely disperse in the bitumen on an equal or finer scale than the film of bitumen on aggregate. On the other hand, it is well known that SBS polymers dispersed in bitumen to form a phase structure comprising a polymer rich phase and a bitumen rich phase. It is generally accepted that the scale of this phase structure is on the order of less than approximately ten microns. Accordingly, as used herein with regard to the present invention, the phrase "homogeneous blend" refers to a mixture that comprises the bitumen component and block copolymer composition such that the block copolymer composition is dispersed within the bitumen component on the approximate ten micron scale or less.

In certain instances it may be desirable to accelerate this blending process by passing the mixture through a high shear mill. While a high shear mill may be utilized for the entire process, it is typically utilized for a sufficient period of time for the block copolymer to form a homogeneous blend with the bitumen component. Thereafter the stirring is typically accomplished utilizing low shear blending. Both of these processes are well known in the art and are contemplated to be within the scope of the present invention. Once the block copolymer composition and bitumen are mixed, the stirring continues for a period of time from about 2 to about 30 hours while the temperature of the mixture is maintained in order to allow for complete curing of the mixture prior to use. In alternative embodiments of the present process, the stirring occurs for periods of time from 2 to 26 hours, even more preferably from 2 to 24 hours. Note that when the block copolymer composition is added over a longer period of time as noted above, the final time for stirring may need to be adjusted accordingly to take into consideration the duration of block copolymer addition.

The quantity of block copolymer composition to be added in the process of the present invention can vary based on whether it is desirable to have a concentrate which will be subsequently diluted ("let down") before further use or whether the amount added provides the final dilution to be used at that time (the final product). Accordingly, the amount to be added will be such that the amount of block copolymer composition added to the bitumen component will be from as little as about 2% by weight to as high as about 36% by weight, based on the weight of the polymer modified bituminous binder composition. As used within the scope of this application, the term "let down", as known to those skilled in the art of bitumen, is an industry term used to reference the dilution or diluting of a concentrate bituminous binder composition to the final concentration that will be used. For example, the process of the present invention can be utilized to produce a bituminous binder concentrate which will contain from about 6% by weight to about 36% by weight, preferably from about 9 to 30%, and more preferably from about 12% by weight to about 22% by weight, block copolymer composition (based on the total weight of the polymer modified bitumen binder composition). This bituminous binder concentrate will at some point be diluted with more bitumen to achieve the desired final concentration for final use (typically from about 2% by weight to about 8% by weight based on the total weight of the polymer modified bitumen binder composition). The process of diluting a polymer modified bituminous binder concentrate to the desired concentration for use is well known in the art as a cost effective method of utilizing blending equipment. The bituminous binder concentrate of the present invention may be diluted ("let down") to the final concentration during or immediately following the curing process or, in the alternative, it may be stored and/or shipped to a different location where it will later be diluted ("let down") to the final concentration. Accordingly, the process of the present invention may optionally contain further steps in the production of polymer modified bituminous binder compositions. One such embodiment allows for the preparation of a concentrate comprising 6 to 36% by weight of the block copolymer composition followed by the dilution of the concentrate with more bitumen to achieve the desired final concentration (preferably for a final concentration of from about 2% by weight to about 8% by weight). This dilution may occur either during curing (step (c)) or subsequent to curing after step (c) provided that the temperature is maintained for the required time to achieve the cure. During or subsequent to curing, the composition may be shipped to a different location provided that adequate temperature and agitation are maintained. When diluting during the cure, the composition may be diluted as soon as the concentrate blend becomes homogeneous (at the beginning of step (c) or as the composition cures (during step (c)). This embodiment is advantageous when expensive milling equipment is used so that higher throughput may be achieved. Alternatively, the concentrate composition may be let down after the curing process is complete. This embodiment is advantageous for long term storage as the diluting bitumen may be introduced at a much lower temperature resulting in a final blend at a temperature more suitable for long term storage.

The present invention further provides for an alternative to the above process that differs from the above process in that the bitumen is first heated to a molten state, the block copolymer composition is added, and then the temperature is raised to the level for curing, from about 160° C. to about 210° C. Accordingly, the present alternative only includes changes in the process steps themselves, not within the types of materials utilized (e.g., bitumen and block copolymer composition) or means of accomplishing the steps (e.g., type of equipment utilized). More specifically, in this alternative, the bitumen component, as described hereinbefore, is heated in a stirred tank until the bitumen component is in a molten state. As used herein, the phrase "molten state" refers to the point at which the bitumen component becomes liquid. Those skilled in the art will recognize that most bitumens reach a "molten state" within the temperature range of from about 87° C. to about 121° C., more specifically from about 93° C. to about 105° C. During this phase, the bitumen component is optionally stirred. Once the bitumen component reaches a molten state, the block copolymer composition is added in the manner described hereinbefore. At this point, if the mixture is not already being stirred, active stirring may begin although stirring is not necessary. After the block copolymer composition is added, the temperature is raised to from about 160° C. to about 210° C. (as described hereinbefore) while actively stirring the bitumen component and block copolymer composition in order to form a homogeneous mixture of the two components. This mixture will continue to be stirred at the noted temperature for a total of from about 2 hours to about 30 hours until a cured polymer modified bituminous binder composition is obtained. In the alternative, the homogeneous mixture will be further let down as described hereinbefore either during or after the curing of the polymer modified bituminous binder composition.

The present invention further provides for an alternative to the above process that differs from the above process in that the bitumen is heated to 160° C. (the time depends on the size of the sample). The bitumen is placed in a heater under the high shear mixer, and the heater is utilized to raise the temperature of the bitumen to 160° C. Once the temperature reaches 160° C., the heater is turned off. The mixer rotates at half-speed or approximately 3000 rpm while the coupled block copolymer is added to the bitumen. While the coupled block copolymer is added, the speed of the mixer is increased to full speed or approximately 6000 rpm. Due to the high shear, the temperature of the blend increases to 180° C., whereby when the mixer stops rotating. The mixer will only begin rotating to keep the temperature at about 180° C. After about 1 hour, the coupled block copolymer is fully dissolved.

In addition to the above noted bitumen component and block copolymer composition, other optional ingredients may be added during the process of the present invention, including, but not limited to, resins, oils, stabilizers, antistatics, fillers (such as talc, calcium carbonate and carbon black), polyphosphoric acid, ground tire rubber or flame retardants. The amount of such optional ingredients added can range from 0 to about 20% by weight, based on the total weight of the bituminous binder composition. Particularly preferred additional ingredients are antioxidants which may be added during or after the mixing process to affect the rate of reaction. When antioxidants are added, they are present in an amount from about 0.1% by weight to about 5% by weight, based on the total weight of the bituminous binder composition. In addition, other block copolymers may also be included in the final bituminous binder composition of the present invention. Preferably such block copolymers will be block copolymers of the general formulas C-D-C or (C-D)$_n$X wherein C is a monovinylaromatic hydrocarbon block and D is a conjugated diene block, n is an integer from 2 to 6 and X is the residue of a coupling agent, said block copolymer having a peak molecular weight from about 30,000 to about 400,000 and a vinyl content from about 8 mol percent to about 25 mol percent based on the number of repeat monomer units in the conjugated diene block of the block copolymer. Examples of such block copolymers include, but are not limited to, Kraton D 1101 polymer and Kraton D 1184 polymer, each commercially available from Kraton Polymers LLC. When such additional block copolymers are present, they will preferably be present in an amount up to about 30% by weight, based on the total weight of block copolymer added. When these additional components are added to the process, they are typically added at the same time as the block copolymer composition. Alternatively, these additional components may be added just before the addition of the block copolymer composition or just after the addition of the block copolymer composition.

EXAMPLES

Crack growth is considered one of the most important parameters in the evaluation of base course asphalt pavements. A block copolymer and coupled block copolymer modified bituminous binder composition, as described above, were tested in comparison with an unmodified bituminous composition to determine crack growth behavior. In determining the crack growth behavior, the Schapery theory is used to compare the material with regard to their crack growth behavior. Based upon Paris' law for crack growth, the following formulas can be considered:

$$\frac{dc}{dN} = A \cdot K_{\mathit{eff}}^n$$

Wherein:
c=crack length
N=number of repetitions
A, n=Paris' law parameters
$K_{\mathit{eff}}$=stress intensity factor The Paris formula includes two material constants: A and n. The constant n is considered to be very closely related to the slope of the fatigue test and A can be determined for viscoelastic materials as described with the formula given by Schapery:

$$A = \frac{\pi}{6 \cdot f_t^2 \cdot I_1^2} \left[ \frac{(1-\mu^2)D^2}{2\Gamma} \right]^{1/m} \left[ \int_0^{\Delta t} w(t)^{2(1+1/m)} dt \right]$$

Wherein:
m=slope of the logarithm of the compliance curve as a function of the logarithm of the loading time
t=Poisson's ration
$f_t$=Tensile Strength
Γ=Fracture energy (total energy)
$I_1$=First Stress invariant
D=compliance From this formula, it can be seen that A is dependent on tensile strength, facture energy, stiffness, slope of the compliance curve and Poisson's ration. If these values can be determined, a qualitative comparison between the polymer modified bituminous binder compositions and the unmodified bituminous composition can be made. The parameter A is a function of the components as given in the formula below:

$$A = \int \left\{ \frac{1}{f_t^2}, \left(\frac{1}{\Gamma}\right)^{\frac{1}{m}}, \left(\frac{1}{E^2}\right)^{\frac{1}{m}}, (1-\mu^2)^{\frac{1}{m}} \right\}$$

In this equation, the parameters for tensile strength, total energy and stiffness slope (m) are used for comparison. The results in tension at 20° C. and a reduced strain rate of 1%/s were considered typical for this case. The values are produced in the table below.

|  | Unmodified Bituminous composition | Block copolymer modified bituminous composition with 7.5% by weight polymer content | Coupled copolymer modified bituminous composition with 6% by weight polymer content | Coupled copolymer modified bituminous composition with 7.5% by weight polymer content |
| --- | --- | --- | --- | --- |
| Tensile Strength | 5.8 | 6.5 | 4.5 | 5.5 |
| Total Energy | 1 | 9 | 6 | 9 |
| m-value | 0.5 | 0.38 | 0.38 | 0.38 |

The ratio of the A-value between the unmodified bituminous composition and the block copolymer and coupled block copolymer bituminous binder compositions for a reduced strain rate of 1%/s is given below.

| Mixture | Block copolymer modified bituminous composition with 7.5% by weight polymer content | Coupled copolymer modified bituminous composition with 6% by weight polymer content | Coupled copolymer modified bituminous composition with 7.5% by weight polymer content |
| --- | --- | --- | --- |
| A ratio | 407 | 67 | 292 |

As illustrated in the above table, the A value in Paris' law formula for crack propagation is higher in all cases for the unmodified bituminous composition than for the polymer modified bituminous binder compositions. The results indicate the polymer modified bituminous binder compositions aid in the prevention of the growth of cracks, thus having an improved fatigue performance.

Compression test results are most relevant for predicting the permanent deformation of the asphalt mix. Permanent deformation occurs predominately at higher temperatures and low loading rates, such as a passing truck. Compression tests were conducted comparing the two polymer modified bituminous binder compositions disclosed herein, and an unmodified bituminous composition. The compression test platform consisted of a 3D space frame that was built on an elastically supported concrete block for receiving a specimen. The axial deformation of the specimen was measured with three linear variable displacement transducers (LVDT). A bottom plate and top plate of the frame are kept parallel with three Fortal bars that are connected to the bottom plate and pass through linear bearings in the top plate. The top plate is connected to a MTS 150 kN hydraulic actuator. The force applied to the specimen by the actuator is measured with a 200 kN load cell. The compression test is performed in displacement-control and uses the average of three external LVDTs for feedback.

The test temperature was 40° C., and the strain rate was 0.01%/s. The results indicated that the two polymer modified bituminous compositions were superior, thus resulting in a decrease in permanent deformation, as compared to the unmodified bituminous composition. The results were based on the ultimate surface in the compression test at 40° C. and a strain rate of 0.01%/s, wherein the polymer modified bituminous binder compositions performed significantly better than the unmodified bituminous composition in the test. The results indicate the polymer modified bituminous binder compositions have a much greater resistance to permanent deformation than an unmodified bituminous composition.

Based upon the above results, finite element method (FEM) simulations were conducted to assess the structural benefit of full depth polymer modification in a real pavement structure. In the simulation, the grading and binder content of the base course mix were consequently the same. The materials were constructed to form a simplified structure consisting of three layers:

(1) an asphaltic layer of 150 and 250 mm made of an unmodified bituminous composition, a block copolymer modified bituminous binder composition set forth above containing a 7.5% polymer composition, and a coupled block copolymer modified bituminous binder composition containing 7.5% polymer composition, all of which were described above. The asphalt layers that normally comprise of a wearing course, a binder course, and a base course were simplified to one monostructure of a base course asphalt;

(2) a subbase with a fixed thickness of 300 mm and Young's modulus (~E-modulus) of 300 MPa; and (3) a subgrade with a thickness of 15 m and a modulus of 100 MPa.

The pavement structure was loaded with dynamic half-sinosoidal pulses of 25 ms duration each and 0.8 MPa stress amplitude. This type of loading is different than a moving wheel, but previous studies have shown that this is an effective way to apply more load repetitions in the same time while having a similar material response compared to moving wheel analyses. In each case, 9,000 load repetitions were applied, which is shorter than the average lifetime of the pavement. However, after this number of cycles, distinct differences could be observed between the materials.

The results of the testing observed that the surface maximum deflection of the unmodified bituminous composition was three times higher than the coupled block copolymer bituminous binder composition and 4.5 times higher than the block copolymer bituminous binder composition. The polymer modified bituminous binder compositions showed smaller rut depth development than unmodified bituminous compositions. Therefore, the polymer modified bituminous binder compositions resulted in a greater resistance to permanent deformations. Also, the accumulated unrecoverable strains (damage) that was associated with cracking was significantly smaller for the two polymer modified bituminous binder compositions. Interestingly, the polymer modified bituminous binder compositions that had a 150 mm asphalt thickness suffered less damage than the unmodified bituminous composition of 250 mm thickness. This means a thinner base course layer may be constructed that utilizes less material that traditional base course, resulting in economic savings.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An asphalt paving laminate, comprising a base course and a wearing course bound atop said base course, said base course comprising:
   about 90 to about 98% by weight of a bitumen component having a PEN value of from about 20 dmm to about 55 dmm according to ASTM Method D5 at 25° C.; and
   about 2 to about 10% by weight of a diblock copolymer composition comprising
   (i) a copolymer comprising one polymer block of styrene and one polymer block of butadiene having a peak molecular weight from about 30,000 to about 78,000 and a vinyl content from about 35 to about 80 mol percent based upon the repeat monomer units of the butadiene block, and
   (ii) one or more block copolymers comprising two polymer blocks of styrene and one polymer block of butadiene, the block copolymer selected from linear triblock copolymers having a peak molecular weight that is 1.5 to 3 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the butadiene block, wherein the ratio of (i) to (ii) in the copolymer composition is present at a ratio of greater than 1:1, wherein the base course is in a paving application and has a PEN value in the range of 10 dmm to 100 dmm according to ASTM Method D5 at 25° C.

2. The asphalt paving laminate of claim 1, wherein the copolymer (i) is of the formula A-B and the block copolymer (ii) is selected from block copolymers of the formula A-B-A and (A-B)nX wherein with regard to the formulas A is a block of monovinyl aromatic hydrocarbon, B is a block of conjugated diene, n is an integer from 2 to 6 and X is a coupling agent residue.

3. The asphalt paving laminate of claim 1, wherein the block copolymer composition comprises A-B and A-B-A wherein each A is styrene and each B is butadiene, the peak molecular weight of A-B is from 48,000 to 78,000 and vinyl content is from 46 to 70 mol percent based on the number of repeat monomer units in the conjugated diene block of A-B, and the peak molecular weight of A-B-A is 1.8 to 2.5 times the peak molecular weight of A-B and vinyl content is from 46 to 70 mol percent based on the number of repeat monomer units in the conjugated diene block of A-B-A, and the polystyrene content of A-B is from 25 to 35% and the polystyrene content of A-B-A is from 25 to 35%, wherein said PEN value of said base course is in the range of 20 to 75 dmm.

4. The asphalt paving laminate of claim 1, further comprising the addition of a block copolymer of the formula C-D-C or (C-D)nX, wherein C is styrene, D is butadiene, isoprene or mixtures thereof, n is an integer from 2 to 6 and X is a coupling agent residue, and the additional block copolymer is added in an amount up to 30% by weight, of the total amount of block copolymer added.

* * * * *